United States Patent [19]
Wu et al.

[11] Patent Number: 5,391,026
[45] Date of Patent: Feb. 21, 1995

[54] SPINDLE FOR VERTICAL-HORIZONTAL MACHINE TOOLS

[75] Inventors: Jinn-Fa Wu; Chyi-Liou Lin; Dong-Jou Shien; Chun-Hung Huang, all of Hsinchu, Taiwan, Prov. of China

[73] Assignee: Industrial Technology Research Institute, Hsinchu, Taiwan, Prov. of China

[21] Appl. No.: 122,908

[22] Filed: Sep. 16, 1993

[51] Int. Cl.[6] ................................................ B23C 1/12
[52] U.S. Cl. ....................................... 409/201; 409/211; 409/231
[58] Field of Search ............... 409/201, 211, 216, 230, 409/231, 204

[56] References Cited

U.S. PATENT DOCUMENTS

| | | | |
|---|---|---|---|
| 3,828,649 | 8/1974 | Lecailtel et al. | 409/201 |
| 4,557,645 | 12/1985 | Marsland | 409/211 |
| 4,913,605 | 4/1990 | Schwartzman | 409/231 |

FOREIGN PATENT DOCUMENTS

| | | | |
|---|---|---|---|
| 124539 | 7/1984 | Japan | 409/230 |
| 196141 | 11/1984 | Japan | 409/231 |
| 24009 | 1/1990 | Japan | 409/231 |
| 2167327 | 5/1986 | United Kingdom | 409/201 |

Primary Examiner—Daniel W. Howell
Attorney, Agent, or Firm—W. Wayne Liauh

[57] ABSTRACT

An improvement of spindle for vertical-horizontal machine tools, comprising a built-in motor type spindle, a rotating shaft, a drive device, and a locating-device, wherein the spindle is mounted on the machine tools by means of the rotating shaft; the rotating shaft maintains a 45° incline toward the horizontal and vertical datum lines of the machine tools and is rotably driven by drive device to lead the spindle to change into vertical or horizontal manner; the locating device is provided for ensuring the spindle in accurate position. The characteristics of the invention are that the spindle mandrel is directly driven by a built-in motor within the spindle head; and the rotating shaft is defined to contain a hollow manner therein for the spindle pipelines and power cables to pass through its center.

4 Claims, 6 Drawing Sheets

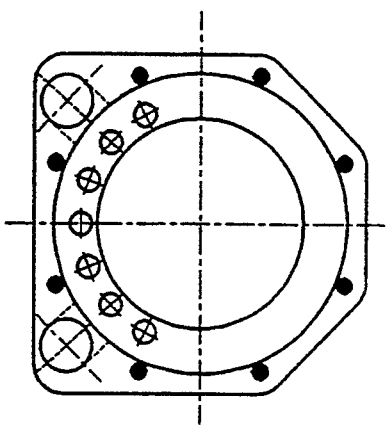
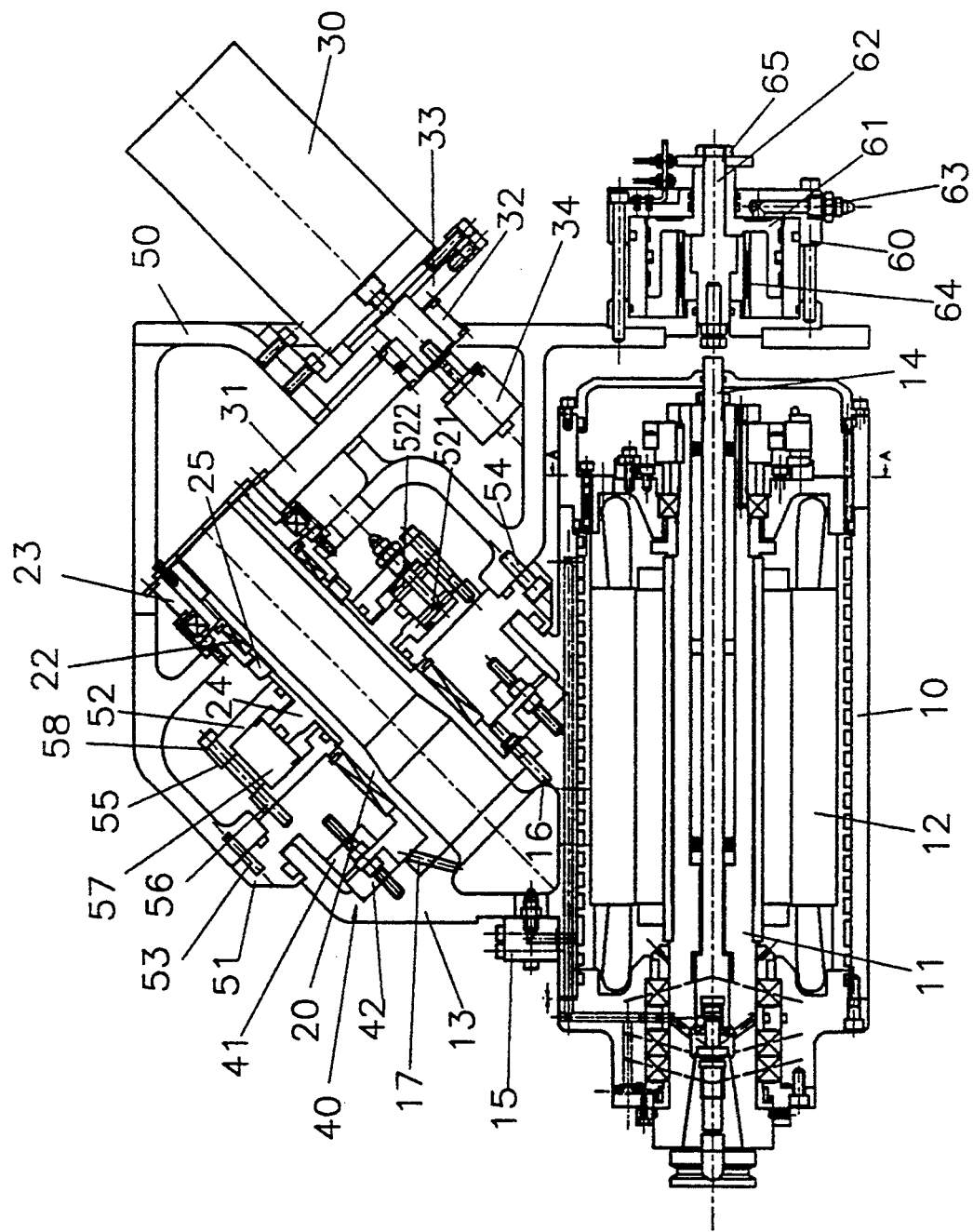
FIG.4b
FIG.4a

SPINDLE FOR VERTICAL-HORIZONTAL MACHINE TOOLS

FIELD OF THE INVENTION

This invention relates to an improvement of spindle head for vertical-horizontal machine tools, and particularly to a simple structure that will increase the speed of the spindle effectively and will arrange wiring in a built-in manner for improving the operational facility and outlook of vertical-horizontal machine tools.

BACKGROUND OF THE INVENTION

Generally speaking, the spindle of machine tools is of either vertical or horizontal type to fit different ways of working as well as different positions of working. A vertical milling machine, for instance, is commonly suitable for vertical milling and drilling work while a horizontal milling machine is normally suitable for lateral milling and drilling work. It is hence necessary to have vertical and horizontal machine tools, respectively, for processing a workpiece in complex form or requiring working in multiple directions. Because of this need, working procedure would become much more complicated, and furthermore, the workpiece has to be held in various positions over and over again thus resulting in loss of working accuracy.

In view of the shortcomings associated with conventional machine tools with only single-action spindle, there has been developments with double-action spindle for vertical-horizontal machine tools. Some machining centers today, for example, have adopted such design of vertical-horizontal spindle. With the design of vertical-horizontal spindle, one single machine tool can thus be provided for the multi-side machining of a workpiece without the need to change in the way of holding the workpiece in appropriate position, whereby working accuracy and efficiency are improved.

Such vertical-horizontal spindle is commonly mounted on a rotating shaft, which forms a 45° angle with respect to the horizontal and vertical datum lines of machine tools, whereby the rotating shaft can be adapted for leading the spindle to change into a vertical or horizontal manner.

Notwithstanding, such vertical-horizontal double-action spindle still has several shortcomings in operation. Referring to FIG. 1, the U.S. Pat. No. 4,841,795, entitled "Double-Rotatable Universal Head for Machine Tools", which relates to an application of motor mounted on machine tool through a gearing system in such a manner: gear 1→gear 2→bevel gear 3→bevel gear 4→bevel gear 5→bevel gear 6, for driving the mandrel 7 in rotation. More specifically, the spindle is driven by the gearing system to change into vertical or horizontal manner.

The vertical-horizontal double-action spindle of such type still needs a complicated gearing system and a long drive shaft for gearing the spindle in operation; therefore, the final structure becomes very complicated. In addition, the spindle also results in an increase in the amount of vibration, thus causing severe power loss, as a consequence the speed of the spindle is hence limited.

Referring to FIG. 2, the structure of another conventional vertical-horizontal double-action spindle, which comprises a built-in motor 8 directly driving the mandrel, and another motor 9 mounted on the distal end of the rotating shaft of said spindle for leading the spindle to change into a vertical or horizontal manner hereof.

Although the spindle of this type may not require the drive shaft and gearing system, and therefore may simplify the structure and increase the speed of the spindle, the spindle has to be externally connected to a certain amount of power cable, pipelines of cooling water, lubrication oil and compressed air. Because all these pipelines are completely exposed, once the spindle is led to change into a vertical or horizontal manner, the pipelines would get swinging accordingly. Furthermore, they could get tangled to affect the operation of the spindle, as a consequence, the pipelines might easily to get polluted and damaged.

In view of this, the invention has devoted himself to the development of an improvement of spindle head for vertical-horizontal machine tools based on his experience in the research and development of related products and through continuous testing and improvement over many years.

SUMMARY OF THE INVENTION

One object of this invention is to provide an improvement of spindle head for vertical-horizontal machine tools, which has a simplified structure while being capable effectively of boosting the speed of the spindle hereof.

Another object of this invention is to provide an improvement of spindle head for vertical-horizontal machine tools, which may arrange connected pipelines in built-in manner rather than exposed and further improve the operating facility and outlook of the spindle hereof.

These and other objects and advantages of the present invention will become apparent to those skilled in the art after considering the following detailed specification together with the accompanying drawings.

BRIEF DESCRIPTION OF THE DRAWINGS

FIG. 4A is a front view of the present invention, showing detailed structure within the present invention.

FIG. 4B is a partial side view of the present invention.

DETAILED DESCRIPTION OF THE PREFERRED EMBODIMENTS

Figure 1:
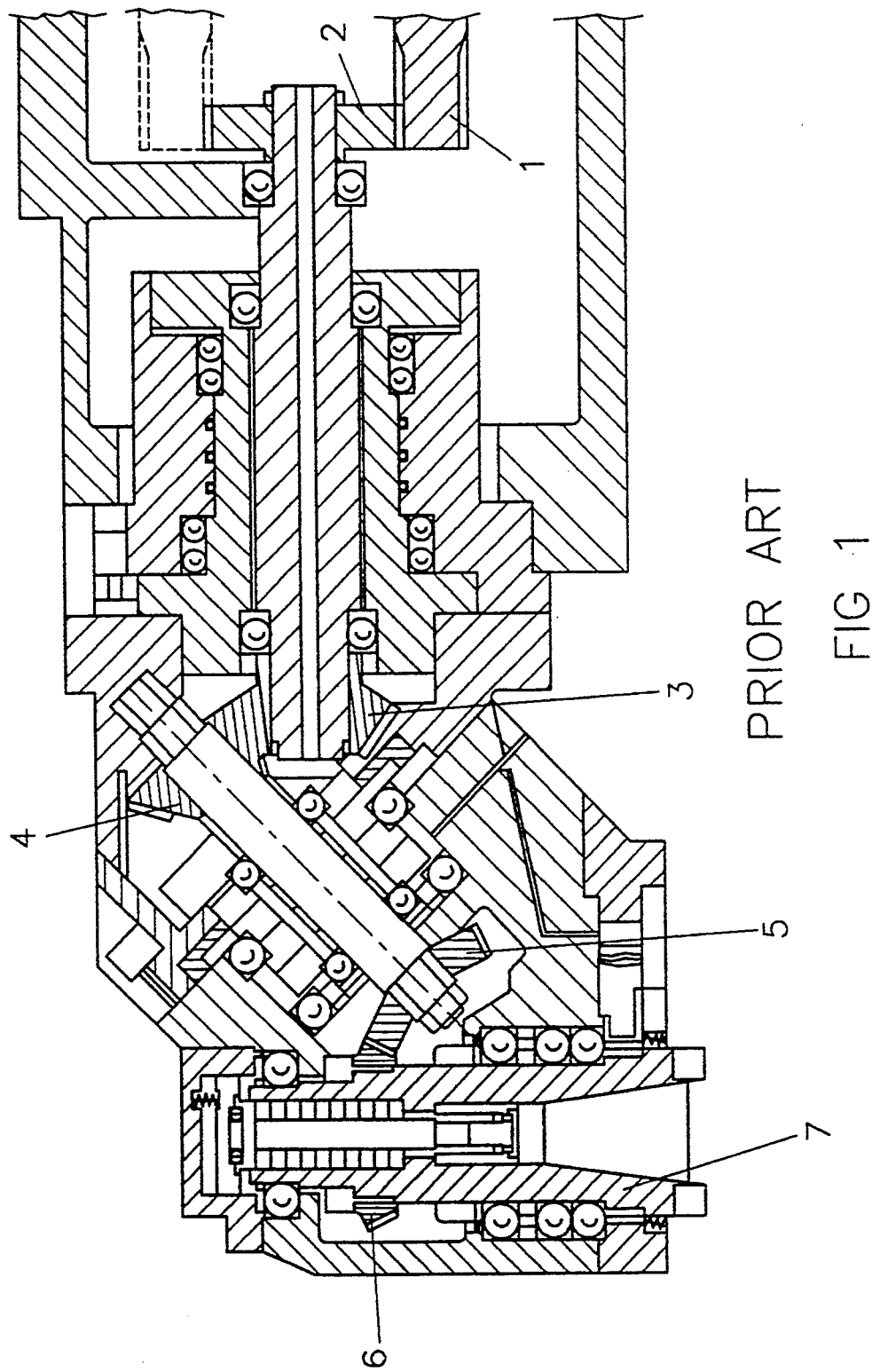
FIG. 1 is a perspective view of the conventional vertical-horizontal spindle.
Figure 2:
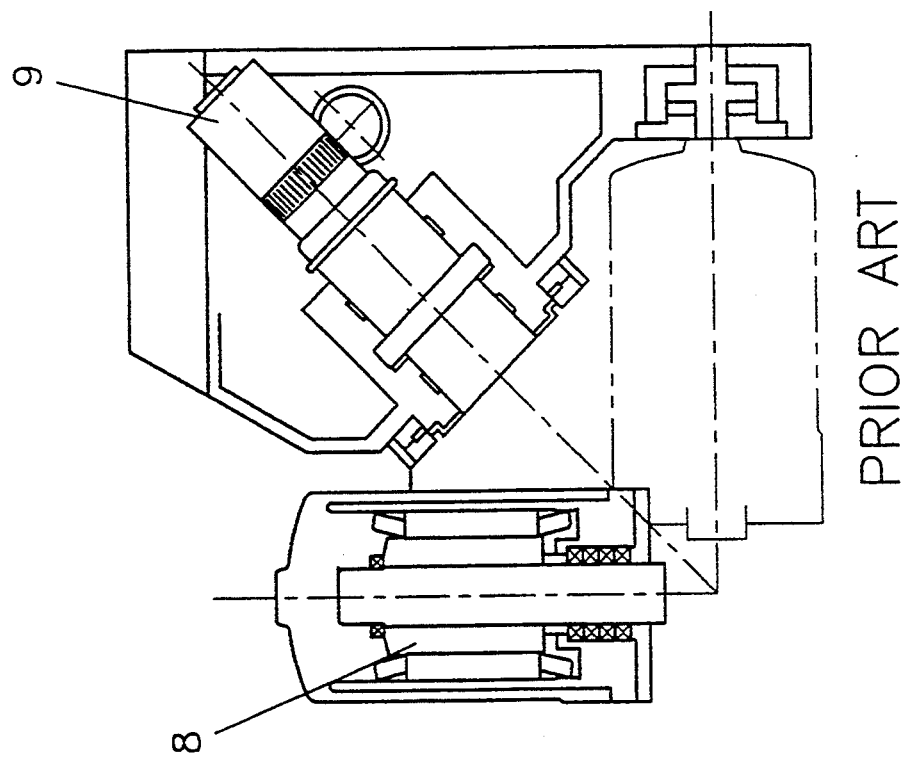
FIG. 2 is a structural diagram, showing another conventional vertical-horizontal spindle.
Figure 3:
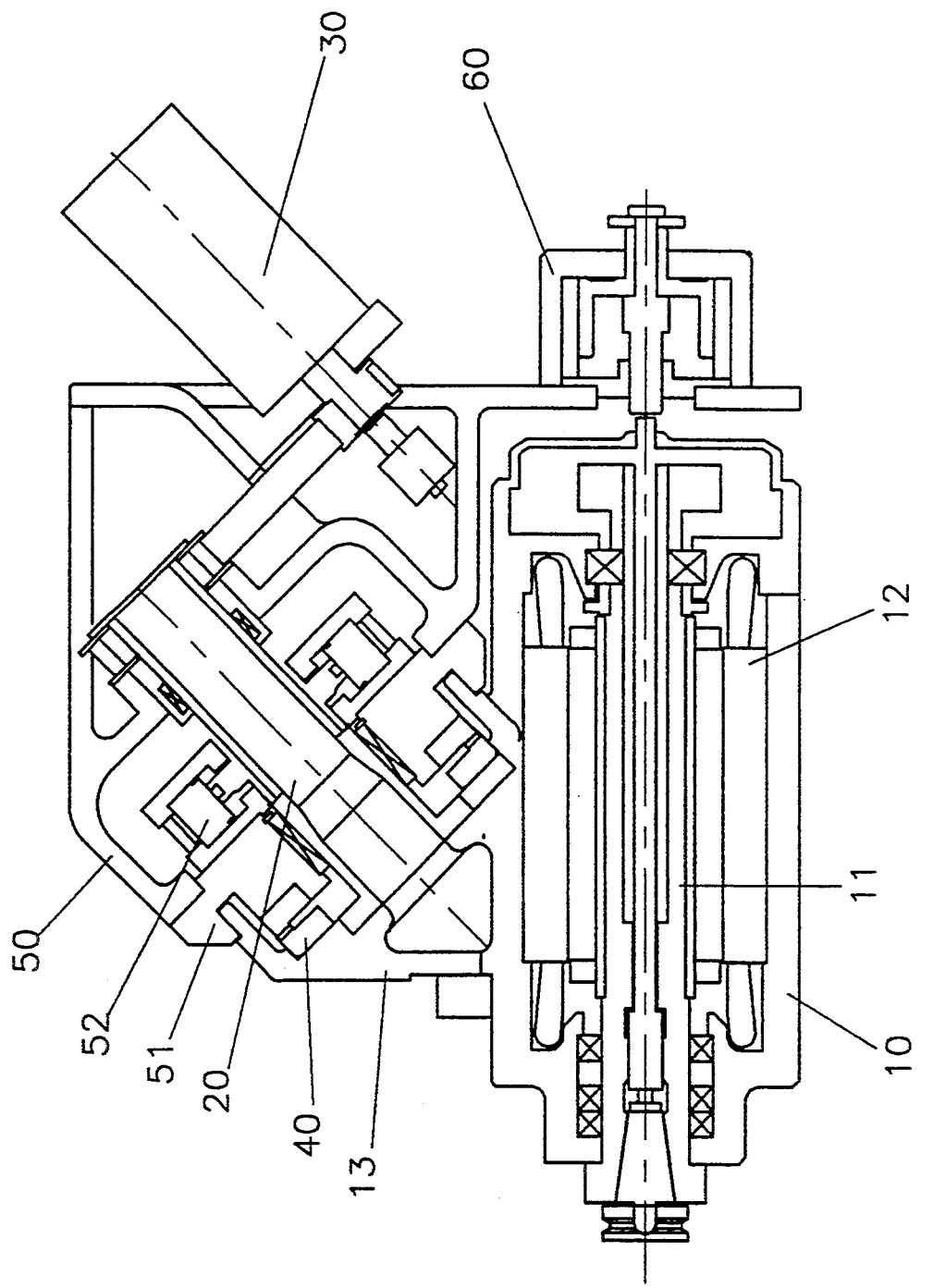
FIG. 3 is a diagramatic view of the system framework of the present invention.

Referring to FIG. 3, the present improvement of the spindle for vertical-horizontal machine tools comprises a spindle head 10, a rotating shaft 20, a drive device 30, a locating device 40, a mounting 50 and a tooling oil cylinder 60, wherein said spindle head 10 is mounted on the mounting 50 by means of rotating shaft 20, and the mandrel 11 of said spindle head 10 is directly driven by a built-in motor 12. The change into vertical or horizontal manner is achieved through the drive device 30 to lead rotating shaft 20 in rotation while enabling the mandrel 11 of said spindle head 10 to appear in horizontal or vertical manner and further locating device 40 is provided for ensuring precise positioning of the spindle head 10. The locating device 40 is lined in pair respectively mounted on rotating base of the spindle head 10 and on the curved-tooth connector of mounting seat 51 of the mounting 50. And an oil cylinder 52 is mounted between the mounting 50 and rotating shaft 20 for the control of the rotating shaft 20 to move up and down reciprocally. When the rotating shaft 20 is driven by the oil cylinder 52 for moving downwardly, the curved-tooth connector will become disengaged to cause the rotating shaft 20 movably driven by the drive device 30. When the rotating shaft 20 is moving upwardly, the curved-tooth connector will become engaged to cause the spindle head 10 in position. On the mounting 50 is a tooling oil cylinder 60 to thrust the tools mounted on the spindle head to get disengaged to facilitate the automatic tooling change mechanism to change tools when the spindle head 10 is located in a horizontal manner.

Referring to FIG. 4, the spindle head 10 has incorporated a motor, by which the mandrel 11 is directly driven. This feature is different from the means of conventional spindle head for indirect transmission through the motor mounted on machine tool mounting and gearing system. Because of this, the speed of said mandrel 11 can be greatly boosted by omitting the drive shaft and gearing system so that gearing structure of the present invention can be highly simplified to incur minimized power loss and the lease amount of vibration on the spindle.

The housing of the spindle head 10 has a rotating base 13 to fit the mounting seat 51 of the machine tool mounting 50 and to achieve a circular sliding fit to the match past of the mounting seat 51, whereby the rotating base 13 and the mounting seat 51 can be engaged in relatively linear movement and rotational sliding. The mounting seat 51 is hence mounted on the mounting 50, held in position by means of locating pin 53 and secured by the screw 54. The center of the rotating shaft 13 is fixedly connected to the rotating shaft 13 by means of screw 16 and locating pin 17, and the spindle head 10 is hence mounted on the mounting 50 by means of the rotating shaft 20.

Figure 5:
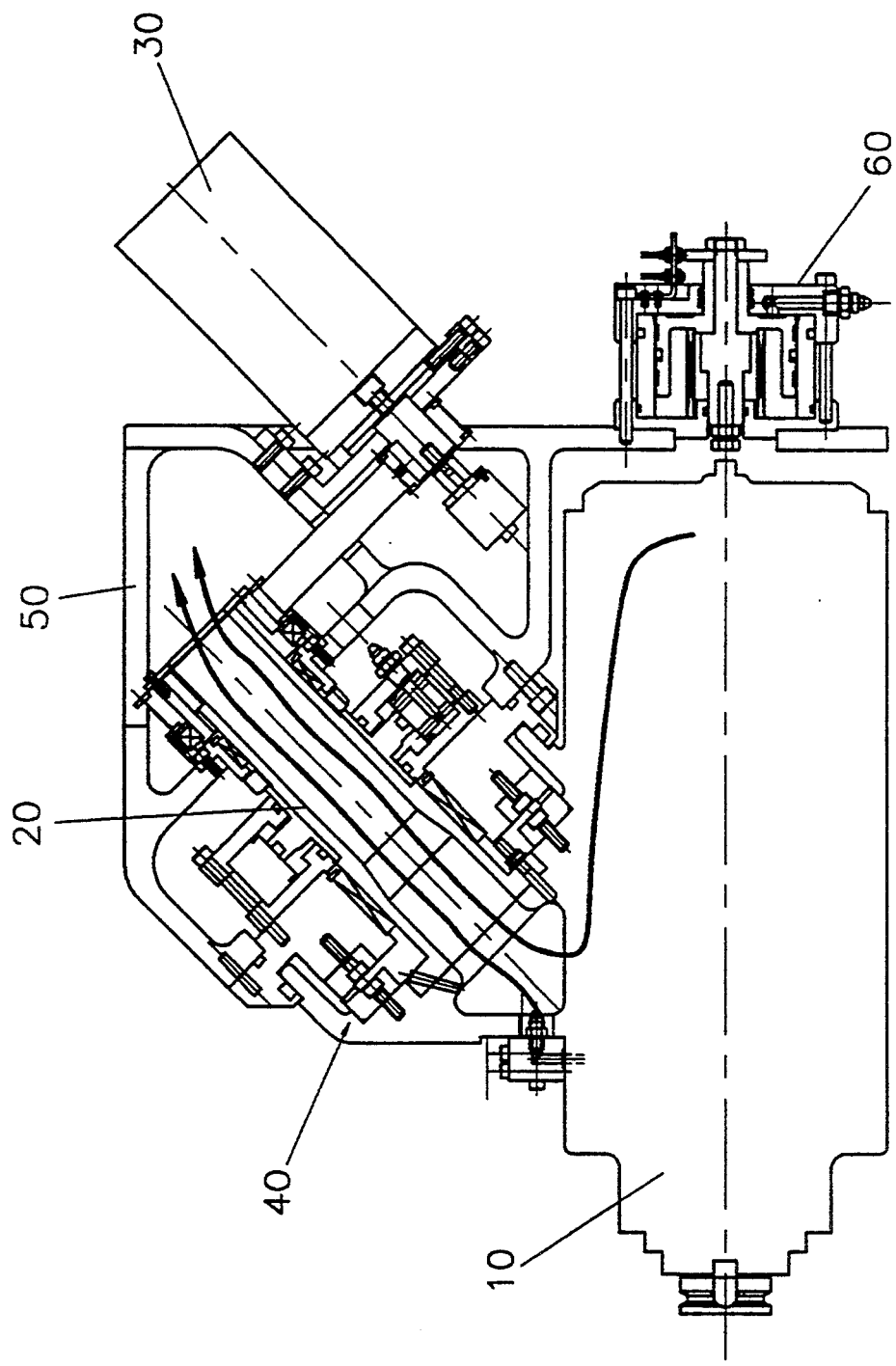
FIG. 5 is a diagramatic view, showing the spindle of the present invention is located in a horizontal manner.
Figure 6:
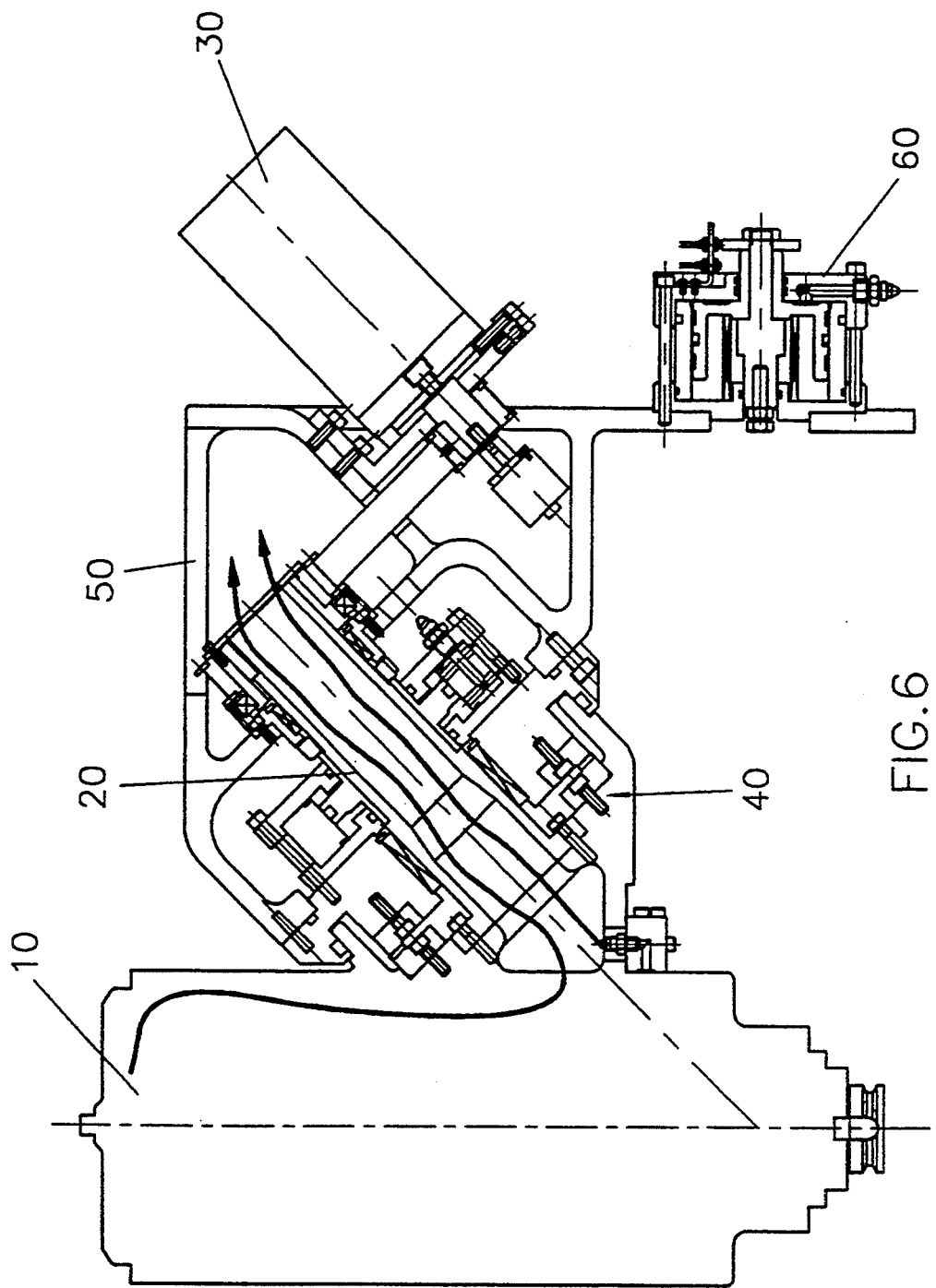
FIG. 6 is a diagramatic view, showing the spindle of the present invention is changed into a vertical manner.

The rotating shaft 20 is located in such a manner so as to form a 45° contact angle with the mandrel 11 of the spindle head 10 and the rotational shaft center is thus positioned at a 45° angle with respect to the horizontal and vertical datum lines of the machine tool, whereby the spindle head 10 can be changed into horizontal manner as shown in FIG. 5, by using the rotating shaft 20 as the rotational shaft center, and yet the mandrel 11 is kept in horizontal manner, or changed into vertical manner as shown in FIG. 6 while the mandrel 11 is changed into a vertical manner.

The rotating shaft 20 is mounted on the mounting 50 by means of needle bearings 21 and 22. The needle bearings 21 and 22 are provided to ensure the rotating shaft 20 to be in position precisely as well as to sustain the weight of the spindle head 10 and large pressure of the spindle head tooling force, and furthermore they may allow the rotating shaft 20 to slide toward the shaft center reciprocally. At distal end of the rotating shaft 20 has a time-scale belt wheel 23 that is connected to another time-scale belt wheel 31 and indirectly driven by primary time-scale belt wheel 32 that is driven by the drive device 30.

The drive device 30 according to the present invention is a hydraulic motor which is mounted on the mounting 50 by means of mounting plate 33 and deviated at a distance from the rotating shaft 20. At distal end of shaft center of the drive device 30 has a coder 34 for sensing and controlling angular displacement of the drive device 30 to encure that the rotating shaft 20 can be driven in rotation up to an accurate angle, whereby the spindle head 10 can be changed into vertical or horizontal manner precisely.

Between rotating base 13 of the spindle head 10 and mounting seat 51 of the mounting 50 has a locating device 40 for ensuring the spindle head 10 to be in accurate position so that the mandrel 11 can be actually kept in either vertical or horizontal level, when the spindle head 10 is located in vertical or horizontal manner. The respectively locating device 40 comprises an upper curved-tooth connector 41 mounted on the mounting seat 51 and a lower curved-tooth connector 42 mounted on the rotating base 13. The contact faces between the upper and lower curved-tooth connectors 41 and 42 have highly accurate convex and concave teeth which can be geared with each other to ensure that the spindle head 10 is in accurate position.

The upper and lower curved-tooth connectors 41 and 42 are thus engaged or disengaged subject to reciprocating displacement of the rotating shaft 20. The rotating shaft 20 includes a piston 24 fixedly cased on the intermediate portion. The piston 24 can be bilaterally pushed by an oil cylinder 52 mounted on the mounting 50 to cause the rotating shaft 20 in reciprocating displacement. The oil cylinder 52 comprises upper cap 55, lower cap 56, cylinder housing 57 and piston 24 which are integrally fixed together by means of bolt 58, wherein piston 24 is connected to the rotating shaft 20 by means of nut 25 and the rotating shaft 20 can be driven by the piston 24 for moving up and down.

Hydraulic oil of oil cylinder 52 will enter the oil cylinder 52 by virtue of an oil line 521 for thrusting the piston 24 upwardly to enable the rotating shaft 20 to move upwardly and to cause the rotating base 13 of the spindle head 10 to move upwardly and further to cause lower curved-tooth connector 42 on the rotating base 13 to be engaged with the upper curved-tooth connector 41.

The upper and lower curved-tooth connectors can be caused to be disengaged from each other to there by allowing hydraulic oil to enter from oil line 522 of the oil cylinder 52 to push the piston 24 downwardly while causing the rotating shaft 20 and rotating base 13 to move downwardly, whereby the upper and lower curved-tooth connectors 41 and 42 are thus caused to be disengaged from. Under such circumstance the rotating shaft 20 can be driven in rotation by drive device 30 while enabling the spindle head 10 to change position hereof.

In addition, to allow the automatic tools change mechanism of the machine tools to change tools, a tooling oil cylinder 60 is hence mounted on the mounting 50 and provided for enabling the tools mounted on the spindle head 10 to disengage from the mandrel 11 in facility of tools change operated on automatic tools change mechanism. The tooling oil cylinder 60 accomodates a piston 61 therein, and the center of the piston 61 further connects to a push rod 62. The piston 61 and the push rod 62 are fixed together by means of nut 65. When hydraulic oil enters from oil line 63 of the tooling oil cylinder, the piston 61 will be pushed to drive the push sod 62 thrust top pull sod 14 mounted on the spindle center of the spindle head 10 while causing the tools mounted on the leading end of the mandrel 11 to be disengaged hereof. When the piston 61 has finished pushing tools aside, it will be pushed back to its original position by a spring 64.

One of main differences between the present invention and the conventional vertical-horizontal spindle head lies in the fact that, the mandrel 11 of the present invention is directly driven by built-in motor 12, and that the spindle head 10 is changed into vertical or horizontal position by means of a drive device 30 rather than the conventional means of the spindle head, which is driven in rotation by a drive shaft which is caused to change position by a gearing system. Therefore, the internal structure of spindle head of the present invention can be greatly simplified and further the speed of mandrel 11 is boosted while the extent of power loss and amount of vibration are hence minimized.

Another important feature of the present invention is drive device 30, which is provided to drive rotating shaft 20 indirectly by means of time-scale belt 31 and the drive device 30 may deviate from the rotating shaft 20 at a certain angle so that the rotating shaft 20 center is defined with a hollow passage for receiving the pipelines of said spindle head 10 therethrough.

Power cable and pipelines of cooling water, air and oil pressure for the spindle head 10 can be arranged through the rotating shaft 20 center and connected to an adaptor 15, which is connected with the circuit, oil, air and cooling water loops within the spindle head.

The manner in which wiring and piping applied to the spindle head 10 of the present invention can maintain all related pipelines within the spindle head 10 without exposure to the atmosphere so that they can be prevented from tangling or swinging as a result of rotation of said spindle head 10, when the spindle head 10 is caused to change position, whereby operational facility and outlook of the spindle head are greatly improved and said spindle head 10 pipelines may be protected against pollution and damage.

What is claimed is:

1. An improvement of spindle for vertical-horizontal machine tools, said machine tools having horizontal and vertical datum lines, said improvement comprising:

a mounting and a mounting seat integrally fixed together;

a spindle having a mandrel and a built-in motor for driving said mandrel in rotation, and said spindle can be led by a rotating base in rotation, said spindle having a spindle head with a housing;

said rotating base being mounted on the housing of said spindle head and rotatably and slidably fit with said mounting seat, said rotating base having a rotating shaft which is at a 45° angle with respect to said spindle center line of said spindle head, and said horizontal and vertical datum lines of said machine tools;

said rotating shaft having defined therein a through passage to allow for power cable and various pipelines to pass therethrough and connect with an external power cable, said rotating shaft being located in the center of said rotating base and fixed attached thereto, said rotating shaft being connected to a piston, which receives a hydraulic pressure from an oil cylinder via an oil line to push said rotating shaft to move up and down;

a drive device for driving said rotating shaft in rotation indirectly by means of a belt to lead said spindle centrally rotating around said rotating shaft to cause said spindle mandrel to change into a vertical or horizontal manner; and a locating device for holding said spindle in position and therefore ensuring said spindle mandrel to be accurately in a vertical or horizontal position;

whereby said spindle mandrel can be directly driven by said built-in motor so as to allow said spindle to have improved operating speed and efficiency as well as simplified drive structure; further because said spindle pipelines are incorporated within said rotating shaft, said spindle is provided with improved operational facility and outlook.

2. The improvement of spindle for vertical-horizontal machine tools as claimed in claim 1, which further comprising a spindle automatic tools change mechanism to cause tools mounted on said spindle to be disengaged from said mandrel by means of a tooling oil cylinder mounted on said mounting, said tooling oil cylinder causing said tools to be pushed out forcibly to facilitate a disengagement of said tools.

3. The improvement of spindle for vertical-horizontal machine tools as claimed in claim 2, wherein said spindle having a top rod and said tooling oil cylinder comprising a piston integrally fixed with a push rod, said push rod being adapted to thrust said top rod of said spindle.

4. An improvement of spindle for vertical-horizontal machine tools, said machine tools having horizontal and vertical datum lines, said improvement comprising:

a mounting and a mounting seat integrally fixed together;

a spindle having a mandrel and a built-in motor for driving said mandrel in rotation, and said spindle can be led by a rotating base in rotation, said spindle having a spindle head with a housing;

said rotating base being mounted on the housing of said spindle head and rotatably and slidably fit with said mounting seat, said rotating base having a rotating shaft which is at a 45° angle with respect to said spindle center line of said spindle head, and said horizontal and vertical datum lines of said machine tools;

said rotating shaft having defined therein a through passage to allow for power cable and various pipelines to pass therethrough and connect with an external power cable, said rotating shaft being located in the center of said rotating base and fixed attached thereto;

a drive device for driving said rotating shaft in rotation indirectly by means of a belt to lead said spindle centrally rotating around said rotating shaft to cause said spindle mandrel to change into a vertical or horizontal manner; and a locating device for holding said spindle in position and therefore ensuring said spindle mandrel to be accurately placed in a vertical or horizontal position;

said locating device further comprising a pair of curved-tooth connectors having precision convex/concave teeth.

* * * * *